US012770811B2

(12) United States Patent
Nikolic et al.

(10) Patent No.: US 12,770,811 B2
(45) Date of Patent: Oct. 20, 2026

(54) VACUUM INTERRUPTER AND ARRANGEMENT COMPRISING VACUUM INTERRUPTERS, AND METHOD FOR TURNING OFF VACUUM INTERRUPTERS

(71) Applicant: SIEMENS ENERGY GLOBAL GMBH & CO. KG, Erlangen (DE)

(72) Inventors: Paul Gregor Nikolic, Erlangen (DE); Tobias Alexander Goebels, Issum Nordrhein-Westfalen (DE); Sylvio Kosse, Coswig (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 299 days.

(21) Appl. No.: 18/291,321

(22) PCT Filed: Jun. 27, 2022

(86) PCT No.: PCT/EP2022/067490
§ 371 (c)(1),
(2) Date: Jan. 23, 2024

(87) PCT Pub. No.: WO2023/001492
PCT Pub. Date: Jan. 26, 2023

(65) Prior Publication Data

US 2024/0339274 A1 Oct. 10, 2024

(30) Foreign Application Priority Data

Jul. 23, 2021 (DE) ..................... 10 2021 207 960.1

(51) Int. Cl.
*H01H 33/662* (2006.01)

(52) U.S. Cl.
CPC ................. *H01H 33/66261* (2013.01); *H01H 2033/66284* (2013.01)

(58) Field of Classification Search
CPC ............. H01H 33/66261; H01H 33/59; H01H 33/161; H01H 2033/146;
(Continued)

(56) References Cited

U.S. PATENT DOCUMENTS 3,597,558 A 8/1971 Gotsch et al.
4,027,123 A * 5/1977 Ihara ...................... H01H 33/14 361/13

(Continued)

FOREIGN PATENT DOCUMENTS

DE 1790217 A1 1/1972
DE 102013208419 A1 11/2014

(Continued)

*Primary Examiner* — William A Bolton
(74) *Attorney, Agent, or Firm* — Laurence A. Greenberg; Werner H. Stemer; Ralph E. Locher

(57) ABSTRACT

A vacuum interrupter for switching voltages, in particular high voltages, has at least one sleeve casing, at least one fixed contact, and at least one movable contact. One or more control elements are arranged directly on the vacuum interrupter. An assembly includes an arrangement of multiple vacuum interrupters that are connected electrically in series. A method for controlling a voltage distribution across the vacuum interrupters is effected by way of control elements, in particular by way of capacitors and/or resistors that are arranged directly on the vacuum interrupters.

20 Claims, 2 Drawing Sheets

(58) Field of Classification Search
CPC .......... H01H 2033/66284; H01H 2033/66292; H02H 3/033
USPC ....... 218/139, 138, 134, 140, 144, 145, 147, 218/118
See application file for complete search history.

(56) References Cited

U.S. PATENT DOCUMENTS

| | | | | |
|---|---|---|---|---|
| 4,434,332 | A * | 2/1984 | Yanabu ................ | H01H 33/143<br>218/144 |
| 7,239,492 | B2 | 7/2007 | Heimbach et al. | |
| 7,285,743 | B2 * | 10/2007 | Martin ................. | H01H 33/027<br>218/138 |
| 8,658,932 | B2 * | 2/2014 | Schellekens ............. | H01H 9/54<br>340/626 |
| 11,456,133 | B2 | 9/2022 | Benkert et al. | |
| 2017/0213675 | A1 | 7/2017 | Hartmann et al. | |
| 2019/0168489 | A1 * | 6/2019 | Benkert .................. | B32B 18/00 |
| 2020/0161065 | A1 | 5/2020 | Djogo | |
| 2021/0327666 | A1 * | 10/2021 | Benkert ........... | H01H 33/66261 |

FOREIGN PATENT DOCUMENTS

| | | | |
|---|---|---|---|
| DE | 102018212853 | A1 | 2/2020 |
| DE | 102019215309 | A1 | 4/2021 |
| JP | S4517483 | Y1 | 7/1970 |
| JP | S5282063 | U | 6/1977 |
| JP | S52142658 | U | 10/1977 |
| JP | S54163773 | U | 11/1979 |
| JP | S59125039 | U | 8/1984 |
| JP | S6123616 | B2 | 6/1986 |
| JP | 2006172848 | A | 6/2006 |
| WO | WO 02097839 | A1 | 12/2002 |
| WO | WO 2020025407 | A1 | 2/2020 |

* cited by examiner

VACUUM INTERRUPTER AND ARRANGEMENT COMPRISING VACUUM INTERRUPTERS, AND METHOD FOR TURNING OFF VACUUM INTERRUPTERS

FIELD AND BACKGROUND OF THE INVENTION

The invention relates to a vacuum interrupter for switching voltages, comprising at least one envelope and comprising at least one fixed contact and comprising at least one movable contact. Furthermore, the invention comprises an assembly comprising above-described vacuum interrupters and a method for distributing a voltage among vacuum interrupters.

Vacuum interrupters or vacuum switches, which comprise assemblies of vacuum interrupters, are power switches in which switching contacts movable relative to one another are arranged in at least one vacuum switching chamber. In high-voltage technology, such vacuum interrupters are used for switching voltages in the high-voltage range, in particular greater than or equal to 52 kV, and/or for switching larger currents in the range up to several tens of kiloamps. Vacuum interrupters, in particular comprised by assemblies for switching, are low maintenance, long-lived, and driven easily and reliably in particular via spring-operated drives. For high-voltage requirements, for example, assemblies comprising multiple vacuum interrupters are used, the switching paths of which are electrically connected in series, as known, for example, from DE 10 2013 208 419 A1. Alternatively, for example, vacuum interrupters having multiple switching paths are used in particular in a vacuum interrupter.

In the case of multiple vacuum interrupters, with open switching paths of the vacuum interrupters, a voltage allocation on the vacuum interrupters which is adapted to the vacuum interrupters is desired, i.e., a voltage distribution, to avoid an overload of individual vacuum interrupters. In the case of vacuum interrupters having multiple switching paths in in particular one vacuum interrupter, with open switching paths of the vacuum interrupter, a voltage allocation or distribution of voltage adapted to the switching paths is desired to avoid an overload. For example, with multiple identically designed vacuum interrupters or switching paths connected one after another, the most uniform possible voltage allocation onto the vacuum interrupters or switching paths is desired. In the case of use of a vacuum interrupter having a switching path, the most uniform possible voltage allocation over the vacuum interrupter or over the switching path is likewise desired, for example.

In order to achieve a desired voltage allocation on the vacuum interrupters or switching paths, for example, passive electrical components such as a control resistor are connected in parallel to a vacuum interrupter. However, these components increase the installation space required for a vacuum switch having a vacuum interrupter or for an assembly having multiple vacuum interrupters. In particular in the case of a vacuum switch having purified and humidified compressed air, i.e., clean air as the insulating gas surrounding the vacuum interrupter, relatively large insulation distances are necessary between a vacuum interrupter and a passive electrical component and between a passive electrical component and a switch housing, which is metallic in particular, of the assembly of one or more vacuum interrupters, since the compressed air has a relatively low dielectric strength in comparison to other insulating gases, such as sulfur hexafluoride. To achieve sufficient insulation between the vacuum interrupters and switches having passive components, for example, it is possible to arrange the vacuum interrupters and interconnected passive components in different housings. However, these arrangements are associated with a high space requirement and costs.

The invention is based on the object of enabling voltage control on a vacuum interrupter and/or an assembly comprising multiple vacuum interrupters with low space requirement and/or specifying a method for distributing a voltage among vacuum interrupters with low space requirement.

SUMMARY OF THE INVENTION

The object is achieved according to the invention by a vacuum interrupter for switching voltages as claimed, an assembly comprising above-described vacuum interrupters as claimed, and/or a method for distributing a voltage among vacuum interrupters, in particular above-described vacuum interrupters, as claimed. Advantageous embodiments of the vacuum interrupter according to the invention for switching voltages and/or the assembly according to the invention comprising above-described vacuum interrupters are specified in the dependent claims. Subjects of the main claim can be combined with features of dependent claims, and features of the dependent claims can be combined with one another.

A vacuum interrupter according to the invention for switching voltages comprises at least one envelope and at least one fixed contact and at least one movable contact. According to the invention, at least one control element is comprised, which is arranged directly on the at least one vacuum interrupter.

Control elements which are arranged in direct contact with the vacuum interrupter, or have a spacing of only a few millimeters from the vacuum interrupter, are designated hereinafter as being arranged directly on the at least one vacuum interrupter. In particular, the control elements are arranged separate from a housing of the vacuum interrupter, not in a common housing. The arrangement of the control elements directly on the at least one vacuum interrupter enables a compact, space-saving arrangement of the control elements and the at least one vacuum interrupter, in particular in a common housing, which is filled, for example, with clean air, with reduced risk of electrical flashover. A compact structure enables a material saving, in particular a small housing size, enables the use of alternative switching gases such as clean air in compact assemblies, reduces costs, and makes a simple, environmentally friendly use of the vacuum interrupters possible.

The vacuum interrupter can comprise an envelope, in particular having at least one main screen and having at least two ceramic segments, wherein the at least one main screen can be arranged between the at least two ceramic segments. The at least one control element can be arranged directly on the envelope of the vacuum interrupter, in particular directly on at least one ceramic segment of the envelope. The arrangement of the at least one control element directly on the envelope of the vacuum interrupter, in particular directly on at least one ceramic segment of the envelope enables a space-saving structure, having the above-described advantages, and an elevated electrical dielectric strength due to the electrically insulating properties of ceramic segments.

The at least one control element may comprise at least one capacitor and/or at least one resistor, and/or at least one control element may be at least one capacitor and/or at least one resistor, and/or all the control elements May consist of capacitors and/or resistors. Capacitors and resistors are suitable for reducing voltages on vacuum interrupters, or controlling or selectively influencing a voltage drop in particular across elements of the vacuum interrupter, such as switching contacts in the open state, main screens, and/or ceramic segments. In particular capacitors, or resistors, or a combination of capacitors and resistors are/is suitable for creating a predetermined, desired voltage distribution, or a predetermined, desired potential drop, along vacuum interrupters. In this respect, capacitors and resistors can be produced and mounted inexpensively, compactly and easily.

It is possible to include at least two control elements, in particular three or more control elements, which are arranged in a circle, or concentrically, around the circumference of the at least one vacuum interrupter, around the vacuum interrupter. Such an arrangement enables a uniform field distribution and gradual reduction around the circumference of a vacuum interrupter, a space-saving distribution of a required capacitance and/or an Ohmic resistance, in discrete units that need little space.

It is possible to include a screening ring, in particular an annular and/or circular screening ring, which in particular may be arranged directly on the casing of the vacuum interrupter, and/or which may enclose the circumference of the vacuum interrupter. Such screening rings enable good shielding of electrical fields of the vacuum interrupter toward the outside and homogenization of the field distribution of electrical and/or magnetic fields around the vacuum interrupter. The screening rings may be electrically and/or mechanically connected to shields, or vapor screens, in the vacuum interrupter.

It is possible to include multiple screening rings, which in particular are arranged around the circumference of each ceramic segment, spaced from one another in the longitudinal direction of the vacuum interrupter. With multiple screening rings, the above-described advantages can be achieved easily and all around the vacuum interrupter.

The at least one control element can be arranged electrically and/or spatially between the at least one fixed contact and the at least one movable contact, in particular between the at least one fixed contact and a screening ring, and/or between at least one fixed contact and a main screen, and/or between a screening ring and a main screen, and/or between two screening rings, and/or between the at least one movable contact and a screening ring, and/or between at least one movable contact and a main screen. Electrical contacting of the control elements can be carried out via the contacts, screening rings and/or the main screen. The arrangement of the control elements on the circumference of the vacuum interrupter directly, between the contacts, screening rings, and/or main screen, enables a space-saving, compact arrangement, simple electrical contacting, uniform field distribution with uniform arrangement around the circumference of the vacuum interrupter, and in particular uniform, discrete allocation of the capacitances and/or ohmic resistances between the contacts, screening rings, and/or main screen. This enables a discrete allocation of the capacitances and/or ohmic resistances along the longitudinal axis and/or along the circumference of the vacuum interrupter, and a deliberate or defined distribution of voltage or voltage allocation along the longitudinal axis and/or along the circumference of the vacuum interrupter.

The at least one control element and/or the control elements can have a total capacitance in the range of 10 to 4000 pF, in particular in the range of 500 to 4000 pF. These values enable a targeted or defined distribution of voltage or voltage allocation along the longitudinal axis and/or along the circumference of the vacuum interrupter, having a total value in particular for a distribution of voltage at high voltages in the range of greater than or equal to 52 kV. The vacuum interrupter can be designed to switch voltages in the high voltage range, in particular in the range greater than or equal to 52 kV.

An assembly according to the invention comprising above-described vacuum interrupters comprises at least two, in particular more than two vacuum interrupters, which can be electrically connected in series. The switching of high voltage levels, in particular high voltages in the range of greater than or equal to 52 kV, can be carried out using cost-effective, easily producible vacuum interrupters in this way. A voltage distribution as described above using control elements each along the circumference and/or the longitudinal axis of the vacuum interrupters, enables a voltage allocation on the vacuum interrupters and deliberate voltage distribution among the individual vacuum interrupters, which are connected one behind another in series. The above-described advantages are thus achievable, in particular with a space-saving, compact structure or arrangement.

The assembly according to the invention can comprise a metal tank housing and/or an insulator housing, in which the vacuum interrupter or vacuum interrupters can be arranged, in particular having the metal tank housing and/or insulator housing filled with clean air as the insulating gas. The compact arrangement of the control elements along the circumference and/or the longitudinal axis directly on the vacuum interrupter enables a compact metal tank housing and/or insulator housing, with low material and cost expenditure, reduces the risk of electrical flashover, reduces the insulating gas volume, and/or enables the use of climate-friendly or climate-neutral insulating gases such as clean air in compact, for example, cost-effectively available standard housings.

A method according to the invention for distributing a voltage among vacuum interrupters, in particular above-described vacuum interrupters and/or above-described assemblies comprising vacuum interrupters, comprises a distribution of electrical voltage taking place by means of control elements, in particular by means of capacitors and/or resistors, which are arranged directly on vacuum interrupters.

The advantages of the method according to the invention for distributing a voltage among vacuum interrupters, in particular above-described vacuum interrupters and/or above-described assemblies comprising vacuum interrupters, as claimed, and the advantages of the assembly according to the invention comprising above-described vacuum interrupters as claimed are analogous to the above-described advantages of the vacuum interrupter according to the invention for switching voltages as claimed and vice versa.

In the following, exemplary embodiments of the invention are schematically illustrated in the figures and described in more detail hereinafter.

DETAILED DESCRIPTION OF THE INVENTION

Figure 1:
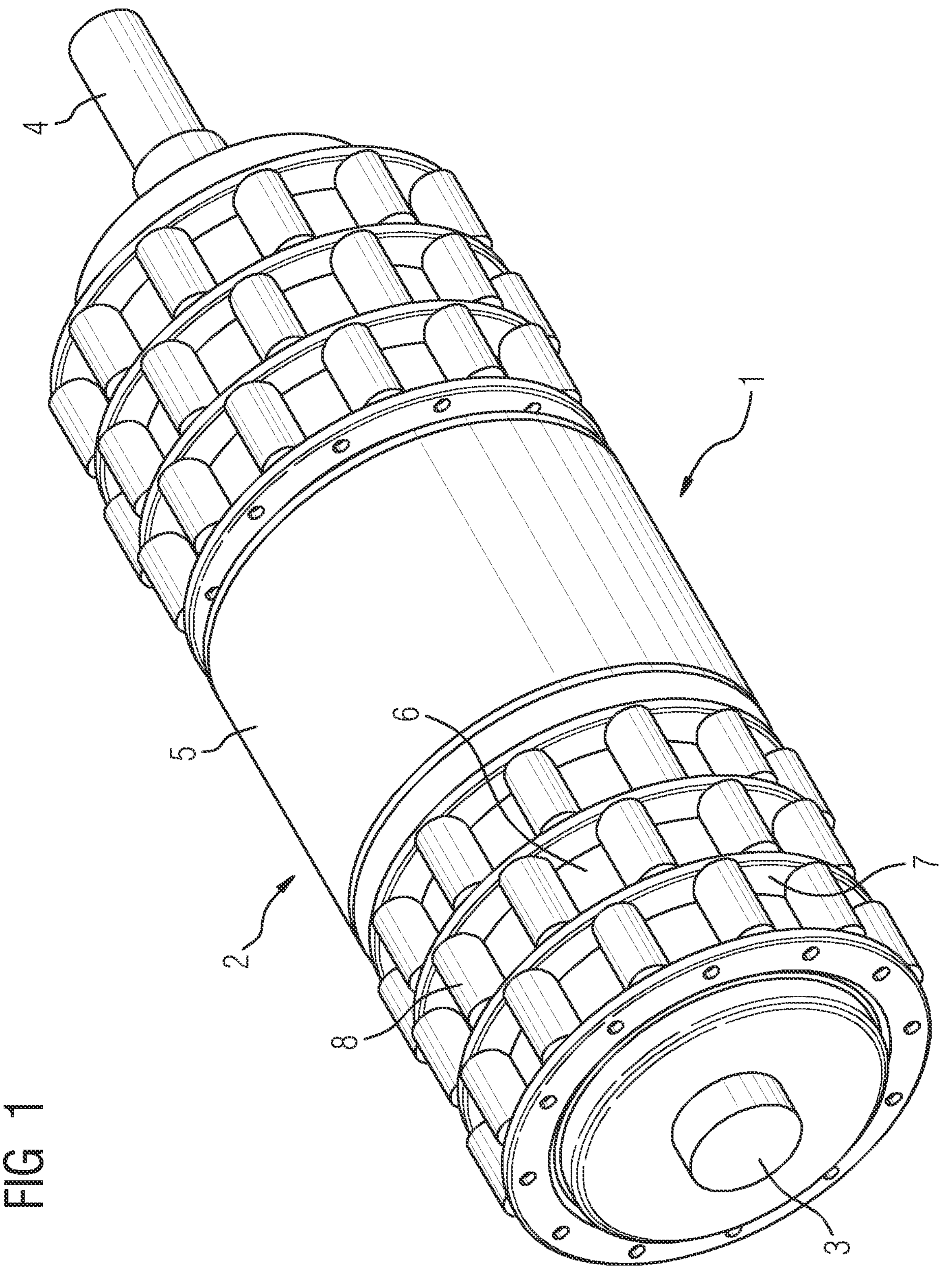
FIG. 1 schematically shows a vacuum interrupter 1 according to the invention for switching voltages in a diagonal view from the side, comprising control elements arranged directly on an envelope 2 of the vacuum interrupter.

FIG. 1 schematically shows a vacuum interrupter 1 according to the invention for switching voltages, in particular high voltages in the range greater than or equal to 52 kV, in a diagonal view from one side as an example. The vacuum interrupter 1 has an envelope 2, which comprises, inter alia, a middle main screen 5 and a ceramic segment 6 adjoining flush in each case on the right and left. The main screen 5 and the ceramic segments 6 are designed as hollow cylindrical or tubular and are each closed fluid tight at the ends of the vacuum interrupter 1. In the interior, the vacuum interrupter 1 is evacuated or a vacuum prevails. Contacts 3 and 4 protrude from the ends of the vacuum interrupter 1 into the envelope 2 of the vacuum interrupter 1, for example, a fixed contact 3 from one side or base surface of the cylinder and a movable contact 4 from the other side or top surface of the cylinder, i.e., the vacuum interrupter 1.

The main screen 5 is made, for example, of a metal, in particular stainless steel, and comprises, for example, vapor screens in the interior, which are not shown for the sake of simplicity in the figures. The hollow cylindrical ceramic segments are produced, for example, from sintered ceramic and in particular are surface treated. The contacts 3 and 4 are made, for example, of copper, in particular in the form of a bolt, having, in particular, slotted, plate-shaped ends in the interior of the vacuum interrupter 1. The fixed contact 3 is connected fluid 19 tight to a cover-shaped closure on one end of the vacuum interrupter 1, wherein the closure is produced, for example, from a metal, in particular copper or steel. The movable contact 4 is connected fluid-tight to a cover-shaped closure on the other end of the vacuum interrupter 1, for example, movably mounted via a folded bellows, which is not shown for the sake of simplicity in the figures, wherein the closure is produced, for example, from a metal, in particular copper or steel.

The vacuum interrupter 1 can be electrically contacted via the bolts of the fixed contact 3 led outward and the movable contact 4. The movable contact 4 enables electrical switching by moving toward the fixed contact 3, i.e., to close a gap between the plate-shaped contact ends of the contacts 3 and 4, upon switching on, and by moving away from the fixed contact 3, i.e., to create a gap between the plate-shaped contact ends of the contacts 3 and 4, upon switching off. The gap created between the contact ends of the contacts 3 and 4 and the contact ends themselves are arranged in the evacuated interior of the vacuum interrupter 1, due to which a gap in the range of millimeters up to centimeters is sufficient for switching high voltages in particular. The vacuum interrupter 1 has, for example, a length in the range of in particular 30 to 100 cm, and a circumference in the range of in particular 10 to 100 cm.

According to the invention, control elements 8 are arranged around the circumference of the vacuum interrupter 1 directly on an envelope 2 of the vacuum interrupter. Control elements 8 are, for example, capacitors and/or resistors. Capacitors are in particular ceramic capacitors, for example, having values of the capacitance of individual capacitors in the range of 10 to 4000 pF. A total capacitance of the assembly thus results in the range of 10 to 4000 pF, for example. Resistors are in particular ohmic resistors, for example, having values of individual resistors in the range of a few ohms up to several hundred ohms, or several thousand ohms, or several hundreds of thousands of ohms. A total resistance therefore results in the range of a few ohms, up to several hundred ohms, or several thousand ohms, or several hundreds of thousands of ohms.

The control elements 8 have, for example, a cylindrical, rectangular, and/or elliptical shape. An arrangement of the control elements 8 around the circumference of the envelope 2 of the vacuum interrupter 1 is carried out, for example, in a circle along the cross section of the circumference, wherein the control elements are in particular interconnected in parallel to one another, in particular at regular and/or equal distances from one another, and/or is carried out along the longitudinal axis of the vacuum interrupter 1, electrically interconnected in series. Electrical contacting of adjacent control elements 8 connected one behind another in series is carried out for example via screening rings 7, which are each arranged or formed in a circle or in a ring along the cross section of the circumference of the vacuum interrupter 1, with the screening rings 7 spaced from one another along the longitudinal axis of the vacuum interrupter 1.

As shown in FIG. 1, the control elements 8 are arranged, for example, along the circumference of the envelope 2 of the vacuum interrupter 1 electrically and spatially spaced apart on circular cross sections of the circumference of the vacuum interrupter 1, along the longitudinal axis of the vacuum interrupter 1 between the fixed contact 3 and the movable contact 4, in particular between the fixed contact 3 and a screening ring 7, between adjacent screening rings 7, between a screening ring 7 and the main screen 5, between the main screen 5 and a screening ring 7, between adjacent screening rings 7, between a screening ring 7 and the movable contact 4, in particular arranged symmetrically. The screening rings 7 and the main screen 5 are used for the good electrically conductive contacting of the control elements 8 among one another and between or with the contacts 5 and 6, for example, via the cover-shaped closures at the ends of the vacuum interrupter 1, and in particular in the case of the movable contact 4 via the folded bellows.

Screening rings 7 are made, for example, of a metal, in particular copper and/or steel, and can divide ceramic segments 6 via vapor screens in particular, which protrude into the vacuum interrupter 1. A connection of the elements of the vacuum interrupter 1, such as ceramic segments 6, main screen 5, screening rings 7, cover-shaped closures, and/or to control elements 8 is carried out, for example, by soldering and/or conductive adhesive bonding. An arrangement of the control elements 8 directly on the vacuum interrupter 1 or the envelope 2 of the vacuum interrupter 1 comprises a materially-bonded mechanical contact with the envelope 2 and/or a small distance in the range of millimeters up to one centimeter, wherein the direct contact with the envelope takes place, for example, via the screening rings 7, the main screen 5, and/or the cover-shaped closures.

Control elements 8 between different screening rings 7 are arranged, for example, along the longitudinal axis of the vacuum interrupter 1 on lines parallel to the longitudinal axis, which are in particular straight or curved, or are each arranged offset in relation to one another. The arrangement of the control elements 8 on the circumference of the vacuum interrupter results, for example, in regular or irregular patterns. A direct arrangement of the control elements 8 on the circumference of the vacuum interrupter 1 or its envelope 2 is space-saving, with minimized cross section of the assembly.

Figure 2:
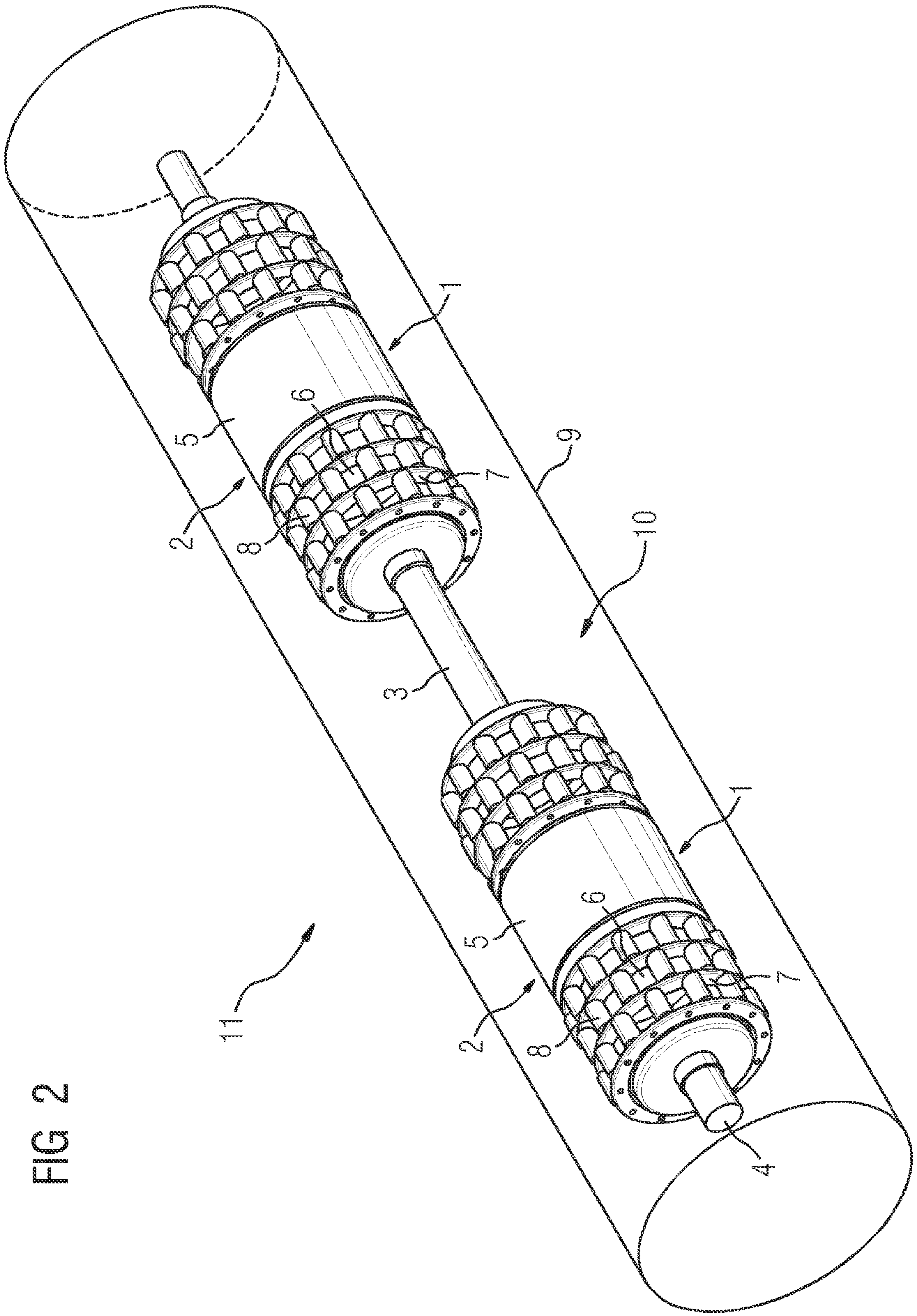
FIG. 2 shows an assembly 11 according to the invention of two vacuum interrupters 1 of FIG. 1 which are connected in series and are enclosed by a housing 9 that is filled, for example, with clean air as an insulating gas 10.

FIG. 2 shows two vacuum interrupters 1 according to the invention of FIG. 1 arranged in series one behind the other, according to an assembly 11 according to the invention of vacuum interrupters 1. The vacuum interrupters 1 are arranged in a housing 9 or are spatially enclosed by the housing 9. The housing 9 is, for example, a gas tight sealed metal tank and/or a gas tight sealed insulator housing. Metal tank housings are made, for example, of steel and/or aluminum, in particular at ground potential in the manner of a dead tank. Insulator housings are made, for example, of ceramic, silicone, and/or composite materials, in particular having a ribbed outer surface to extend leakage current paths. The housing 9 is filled, for example, with clean-air as an insulating gas 10, which is climate-neutral. Alternatively, insulating gases 10 such as $SF_6$ and/or $CO_2$ can be used.

The vacuum interrupters 1, as shown in FIG. 2, are connected to one another via the fixed contacts 3, in particular directly connected. Alternatively, the vacuum interrupters 1 can be connected to one another via the movable contacts 4, in particular electrically and mechanically, or a connection takes place via a movable contact piece 4 and a fixed contact piece 3. One or more drives, for example a motor-operated drive and/or spring-operated drive, are provided, for example, to drive the movable contacts 4 during the electrical switching, which is not shown in the figures for the sake of simplicity. For example, one drive per movable contact 4 is provided, or a common drive is comprised, in particular having a transmission for mechanically driving the movable contacts 4.

The above-described exemplary embodiments can be combined with one another and/or can be combined with the prior art. Thus, for example, more than two vacuum interrupters 1 can be mutually interconnected, in particular in series and/or in parallel. The control elements 8 can have different shapes, in particular circular-cylindrical, or cylindrical with elliptical base surface and top surface, rectangular, square, and/or shapes having convex and/or 21 concave surface. The control elements 8 are fastened, for example, on the vacuum interrupter 1 by soldering, in 23 particular on metal parts such as copper parts, by screws, by adhesive bonding, by clamping, and/or by welding. The control elements 8 are arranged, for example, directly in a friction-locked manner on the envelope 2, in particular on ceramic segments 6, in particular electrically insulated from the ceramic segment by an insulating paint and/or a surface treatment, and/or, for example, fastened via spring connections. And/or control elements 8 are arranged, for example, directly on the envelope 2, in particular on ceramic segments 6, at a slight distance from the ceramic segments 6, in particular between the screening rings 7, main screen 5, and/or contacts 3, 4, for example, connected by screws, clamped, soldered, adhesively bonded, and/or welded, and/or, for example, fastened via spring connections. A small distance is, for example, in the range of a few millimeters up to one centimeter.

The control elements 8 are arranged, for example, on the envelope 2 of the vacuum interrupter 1 or vacuum interrupters 1 as discrete components, in particular spaced apart from one another. In this case, an arrangement is, for example, annular, in each case along a, for example, circular cross section of the vacuum interrupter 1, having different rings along the longitudinal axis of the vacuum interrupter 1. Adjacent control elements 8 in different rings are arranged, for example, on straight lines, or offset to one another. Alternatively or additionally, the control elements 8 can be arranged, for example, on a helical line or spiral. Further arrangements and/or combinations of arrangements are also possible.

Using the above-described vacuum interrupter 1 according to the invention and the assembly according to the invention of vacuum interrupters 1 according to the invention in series one behind another, in particular interconnected in series, it is possible to distribute voltages over the vacuum interrupters 1 via the control elements 8. Voltages can be allocated uniformly or differently, in a predetermined manner via the selection of the control elements 8 and the interconnection thereof, on the vacuum interrupters 1 and/or elements of the vacuum interrupters 1, such as ceramic segments 6 of different lengths, for example. The direct arrangement of the control elements 8 on the vacuum interrupter 1 or the vacuum interrupters 1 enables a compact, space-saving structure, which enables a cost-effective, spatially minimized housing 9, and in particular enables the use of insulating gases, such as clean air, with small or minimized and/or standard dimensions of housings 9.

LIST OF REFERENCE SIGNS

1 vacuum interrupter
2 envelope
3 fixed contact
4 movable contact
5 main screen
6 ceramic segment
7 screening ring
8 control element
9 housing
10 insulating gas
11 assembly comprising vacuum interrupters

The invention claimed is:

1. A vacuum interrupter for switching voltages, the vacuum interrupter comprising:
at least one envelope, at least one fixed contact, and at least one movable contact;
at least one control element disposed directly on the vacuum interrupter; and
at least one screening ring arranged directly on a casing of the vacuum interrupter and/or enclosing a circumference of the vacuum interrupter.

2. The vacuum interrupter according to claim 1, wherein said at least one envelope is a single envelope having at least one main screen and at least two ceramic segments, wherein said at least one main screen is arranged between said at least two ceramic segments, and said the at least one control element is arranged directly on said envelope.

3. The vacuum interrupter according to claim 2, wherein said at least one control element is arranged directly on at least one of said ceramic segments of said envelope.

4. The vacuum interrupter according to claim 2, wherein said at least one screening ring is one of a plurality of screening rings arranged around a circumference of each said ceramic segment, and spaced from one another in a longitudinal direction of the vacuum interrupter.

5. The vacuum interrupter according to claim 1, wherein at least one of the following is true:
said at least one control element includes at least one capacitor and/or at least one resistor;
said at least one control element is formed of at least one capacitor and/or at least one resistor;
said at least one control element is one of a plurality of control elements and all of said control elements consist of capacitors and/or resistors.

6. The vacuum interrupter according to claim 1, wherein said at least one control element is one of a plurality of control elements arranged in a circular arrangement on a circumference of the vacuum interrupter.

7. The vacuum interrupter according to claim 6, wherein said control elements are at least two control elements.

8. The vacuum interrupter according to claim 6, wherein said control elements are three or more control elements.

9. The vacuum interrupter according to claim 1, wherein said at least one screening ring is an annular and/or circular screening ring.

10. The vacuum interrupter according to claim 1, wherein said at least one control element is electrically and/or spatially arranged between said at least one fixed contact and said at least one movable contact.

11. The vacuum interrupter according to claim 10, wherein at least one of the following is true:

said at least one control element is arranged between said at least one fixed contact and a screening ring; and/or said at least one control element is arranged between said at least one fixed contact and a main screen; and/or said at least one control element is arranged between a screening ring and a main screen; and/or said at least one control element is arranged between two screening rings; and/or said at least one control element is arranged between said at least one movable contact and a screening ring; and/or said at least one control element is arranged between said at least one movable contact and a main screen.

12. The vacuum interrupter according to claim 1, wherein said at least one control element or a plurality of said control elements have a total capacitance in a range from 10 to 4000 pF.

13. The vacuum interrupter according to claim 12, wherein the total capacitance lies in a range from 500 to 4000 pF.

14. The vacuum interrupter according to claim 1, configured to switch voltages in a high-voltage range greater than or equal to 52 kV.

15. An assembly, comprising at least two vacuum interrupters, each according to claim 1, electrically connected in series.

16. The assembly according to claim 15, which comprises a housing, being a metal tank housing and/or an insulator housing, and wherein said at least two vacuum interrupters are disposed in said housing.

17. The assembly according to claim 16, which comprises an insulating gas, being clean air, filled in said housing.

18. A method, comprising:

providing vacuum interrupters, each vacuum interrupter having:

at least one envelope, at least one fixed contact, and at least one movable contact, at least one control element disposed directly on the vacuum interrupter, and the control elements being capacitors and/or resistors arranged directly on the vacuum interrupters, and at least one screening ring arranged directly on a casing of the vacuum interrupter and/or enclosing a circumference of the vacuum interrupter; and controlling an electrical voltage distribution among the vacuum interrupters by way of the control elements.

19. The method according to claim 18, which further comprises providing the vacuum interrupters in an assembly having at least two vacuum interrupters electrically connected in series.

20. A vacuum interrupter for switching voltages, the vacuum interrupter comprising:

at least one envelope, at least one fixed contact, and at least one movable contact; and at least one control element disposed directly on the vacuum interrupter, and said at least one control element or a plurality of said control elements have a total capacitance in a range from 10 to 4000 pF.

* * * * *